US006901732B2

(12) United States Patent
Bares et al.

(10) Patent No.: US 6,901,732 B2
(45) Date of Patent: Jun. 7, 2005

(54) COTTON FEEDING ROLLER STRUCTURE

(75) Inventors: Robert Matthew Bares, Johnston, IA (US); Jeffrey Robert Fox, Minburn, IA (US); Michael Lee Pearson, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/695,096

(22) Filed: Oct. 28, 2003

(65) Prior Publication Data
US 2005/0086921 A1 Apr. 28, 2005

(51) Int. Cl.$^7$ ............................................. A01D 39/00
(52) U.S. Cl. ......................................... 56/341; 100/88
(58) Field of Search ........................ 56/341, 28; 100/88

(56) References Cited
U.S. PATENT DOCUMENTS

| 3,466,857 | A | * | 9/1969 | Gaul et al. ..................... 56/30 |
| 3,651,755 | A | * | 3/1972 | Gati ............................ 100/96 |
| 4,452,134 | A | * | 6/1984 | Muse ........................... 100/90 |
| 4,548,131 | A | * | 10/1985 | Williams ....................... 100/1 |
| 4,553,378 | A | * | 11/1985 | Fachini et al. ................ 56/16.6 |
| 6,032,446 | A | | 3/2000 | Gola et al. ..................... 56/341 |
| 6,263,650 | B1 | | 7/2001 | Deutsch et al. ............... 56/16.4 |
| 6,421,992 | B1 | * | 7/2002 | Goering et al. ................ 56/28 |
| 6,421,996 | B1 | * | 7/2002 | Deutsch et al. ............... 56/341 |
| 6,591,743 | B2 | * | 7/2003 | Deutsch et al. ................ 100/8 |

\* cited by examiner

*Primary Examiner*—Thomas B. Will
*Assistant Examiner*—Meredith C. Petravick

(57) ABSTRACT

Lower spiked rollers in the bottom of a cotton accumulator are inclined in the downstream direction towards an opening and rotate in the same direction to pull cotton down to the opening. An upper spiked roller located above the opening and above the last of the lower spiked rollers is only partially exposed to the cotton in the accumulator. The upper roller meters the cotton and tears apart clumps. An opening above the upper roller defines an upper discharge opening over the main discharge opening. When in a non-rotating condition, the spiked rollers act as a floor for the accumulator and prevent egress of the cotton through the openings.

20 Claims, 3 Drawing Sheets

COTTON FEEDING ROLLER STRUCTURE

FIELD OF THE INVENTION

The present invention relates generally to cotton harvesting implements and, more specifically, to a feeder for an accumulator arrangement on a cotton harvester having on-board cotton processing such as compacting.

BACKGROUND OF THE INVENTION

Cotton harvesters having on-board module forming structure such as described in commonly assigned U.S. Pat. No. 6,263,650 provide a compact bale or module directly on the harvester to reduce the amount of support equipment needed in the field and minimize harvester idle time during offloading. The on-board processing structure includes a bale handling system for moving a formed bale rearwardly to prepare the bale chamber for a second bale with little or no harvester down time. An accumulator allows harvesting to continue during brief interruptions in the operation of the module forming structure or other crop processor. Problems with such an accumulators include regulating the cotton metered from the area to avoid excessive cotton flow that would clog the input to the processor while assuring a generally continuous flow for uniform processing. Too much variation in cotton flow affects the integrity of the formed bale. Flow must be uniform and the cotton should also be uniformly distributed across the width of the in-feed area to the chamber. Although the roller structure of the type described in U.S. Pat. No. 6,263,650 having counter-rotating rollers provides improved metering, uniform feeding without clumping and without wedging of cotton between adjacent rollers continues to be difficult to achieve.

In the cotton industry, a solution to the problems involved with vertical feeding of cotton uniformly without clumps at a specified mass flow rate has been elusive. Current cotton feeding devices used at gins or other fixed locations are not readily applicable to mobile cotton harvesters. One type of feeding structure utilizes two opposing batted rollers that pinch the cotton between them. The cotton is then fed onto a spiked roller to break up clumps. The density of the cotton above the batted rollers must be controlled carefully since an overly high density will cause cotton to bridge over rollers and not flow. Dense cotton often wedges between rollers. Large clumps of cotton result in inconsistent feeding.

Therefore, most current vertically oriented feeder systems are limited to use with low density cotton, require additional processes and equipment to control cotton density, and have high input power requirements. Any use of currently available feeder device on a mobile harvester are severely limited by space, configuration and power requirements on the harvester.

SUMMARY OF THE INVENTION

Lower spiked rollers in the bottom of an accumulator are inclined in the downstream direction towards a lower or main discharge opening and rotate in the same direction to pull cotton down to the opening. An upper spiked roller is located above the opening and above the last of the lower spiked rollers. The upper spiked roller is partially and offset downstream from the rear wall of the accumulator so that it is only partially exposed to the cotton in the accumulator. The upper roller meters the cotton and tears apart clumps. An opening above the upper roller defines an upper discharge opening over the main discharge opening. When in a non-rotating condition, the spiked rollers act as a floor for the accumulator and prevent egress of the cotton through the openings. After cotton fills the accumulator to a desired height, the lower spiked rollers are rotated at the same speed and in the same direction to pull the cotton down the incline toward the main discharge opening. The pulling action also forces cotton into the upper spiked roller which is rotated the same direction as the lower spiked rollers, but at a higher speed.

As the cotton reaches the bottom of the incline, the last lower spiked roller pulls the cotton through the lower discharge opening. At the same time, the faster rotating upper spiked roller tears apart clumps and limits the amount of cotton that can pass through the lower discharge opening. The cotton that is forced against the upper spiked roller is pulled through the upper discharge opening. As the cotton is pulled through the discharge opening, the upper spiked roller tears apart clumps in the cotton. The cotton flow rate through the upper discharge opening is controlled by the speed of the upper roller and the clearance around the roller.

Variations in the structure can include a floor under the lower spiked rollers to prevent cotton from falling through the rollers. Also, a floor with openings under the rollers can be provided to limit falling cotton while allowing any cotton wrapped on the rollers to fall. In another embodiment, the lower rollers can be replaced with a continuous belt or chain conveyor.

The structure allows high density cotton in a vertical accumulator to be fed at a consistent mass flow rate and density and without clumps at the discharge opening. Cotton can be fed consistently regardless of the dimensions of the accumulator over the rollers or belt. The construction, which is relatively simple, utilizes slower moving parts and requires less power than most previously available cotton metering systems. The construction also provides greater flexibility in design for mobile cotton harvesting concepts than at least most previously available cotton metering systems.

These and other objects, features and advantages of the present invention will become apparent from the detailed description below in view of the drawings. For example, the spaced lower rollers can be replaced by a

DESCRIPTION OF THE PREFERRED EMBODIMENT

Figure 1:
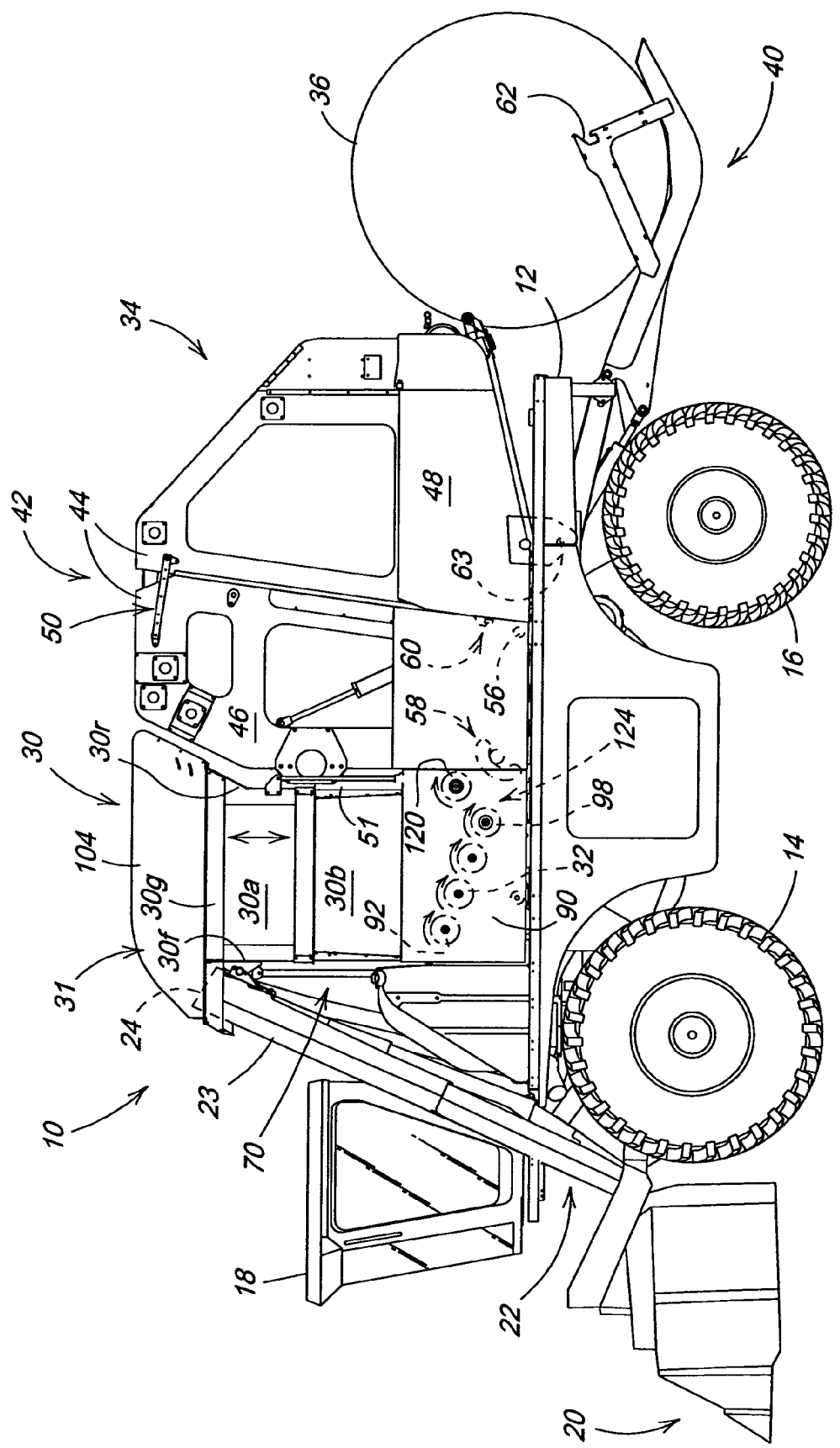
FIG. 1 is a side view of a cotton harvester with an on-board processor and an accumulator with roller structure for feeding a conveyor.

Referring to FIG. 1 therein is shown a cotton harvester 10 having a main frame 12 supported for movement by forward drive wheels 14 and rear steerable wheels 16. A cab 18 is supported at the front end of the main frame 12 above forwardly mounted harvesting structure indicated at 20 which removes cotton from plants and directs the removed cotton into a telescoping air duct system 22 having ducts 23 with upwardly directed outlets 24.

An upright telescoping accumulator system 30 includes an upper inlet or separating hood structure 31 and an opposite lower portion or metering floor 32. The accumulator system 30 is supported on the forward end of the frame 12 behind the cab 18 for receiving the cotton from the air duct system 22. A processor or module builder 34 is supported rearwardly of the accumulator system 30. The accumulator system 30 stores cotton as necessary to facilitate continuous harvesting, and the metering floor 32 distributes the cotton to the module builder 34 which first forms a mat of material and then rolls the mat into a compact round bale or module 36. The accumulator and processor system may be generally of the type shown and described in the commonly assigned U.S. Pat. No. 6,421,996 entitled Harvester with Bale Forming Chamber Having a Transport Mode and in our aforementioned co-pending applications Ser. No. 10/687,256 entitled Baler Gate Linkage and Latch Structure, filed 15 Oct. 2003, and Ser. No. 10/695,095, entitled Separation Hood for a Cotton Harvester filed concurrently with the present application.

A bale or module handling system 40 is located rearwardly of the processor 34 for receiving a formed bale or module 36 from the processor 34. The handling system 40 temporarily supports the module 36 (FIG. 1) for transport during field-working operations and then discharges it from the harvester 10 at the desired location in the field. The module builder 34 includes a baler 42 having a clamshell type of housing 44 having first and second (front and rear) upright or frame sections 46 and 48. The sections 46 and 48 are connected together by a control linkage structure 50. In a field-working position (FIG. 1), the top portions of the sections 46 and 48 are located at or slightly above the level of the top of the accumulator system 30 to establish a maximum working height of the harvester 10. The accumulator structure 30 has upper and lower telescoping sections 30a and 30b, and cylinders 51 on each side of the accumulator structure move the section 30a vertically (arrow of FIG. 1) between a raised operating position (FIG. 1) and a lowered transport position over the section 30b for transport and shipping. The sections 30a and 30b are rectangular in cross section with front and rear walls 30f and 30r connected by opposite side walls 30g, and the section 30a opens upwardly into the hood structure 31. By way of example, the upper section 30b is about twelve feet wide and the lower section 30a tapers to a width of approximately eight feet in the area of the metering floor 32. For a more detailed description of the telescoping accumulator structure, reference may be had to the aforementioned U.S. Pat. No. 6,263,650.

The module builder 34 includes a bale-forming chamber with a round baler belt and roller structure which receives material from the accumulator system 30 when the builder 34 is in the upright field-working position shown in FIG. 1. The baler structure 60 operates in a manner generally identical to that of a conventional round baler and rolls the material into a compact round bale. It is to be understood that various types of delivery systems for conveying the material to the baling device may be utilized with the present invention.

When a complete bale is formed, the rear or gate section 48 of the clamshell housing 44 is rocked rearwardly and upwardly to release the bale from the chamber onto the handling system 40 (FIG. 1). The accumulator system 30 facilitates continued operation of the harvester 10 while the bale 36 is released from the chamber. The handling system 40 is positioned to receive, support and transport the completed bale while the harvesting continues. When the desired location such as the end of the field is reached, the system 40 is activated to lower the bale 36 and release it from the harvester 10.

The front frame section 46 is pivotally connected to the harvester frame 12 by a pivot 56 for rocking between an upright field-working position, a rearwardly and downwardly directed transport position, and a shipping position wherein the bale handler is at ground level. Hydraulically operated latch or securing structure 58 is mounted on the frame 12 and the lower forward portion of the front frame section 46 to lock the front frame section in an upright field-working position. Cylinder structure (not shown) located on each side of the baler includes a first end connected to the frame section 46 and a second end connected to the linkage structure 50.

With the front frame section 46 latched in the upright position and the cylinder structure fully retracted (FIG. 1), the sections 46 and 48 define the bale forming chamber extending upwardly from the harvester frame 12. The top of the chamber is approximately level with the top of the extended accumulator system 30. Automatically operable gate lock structure 60 supported by the frame sections 46 and 48 rearwardly adjacent the front frame pivot 56 latches the sections together as the bale forming chamber is closed during retraction of the cylinder structure. Upon activation of the cylinder structure to open the chamber, there is initial relative vertical motion of the sections 46 and 48 to release the gate lock structure 60.

To open the bale forming chamber, the cylinder structure is extended to initially release the gate lock structure 60 and then to rock the section 48 upwardly relative to the section 46 to open the housing and release the formed bale 36. The released bale 36 can then be carried by the harvester 10 to a convenient deposit area in the field while the harvesting operation continues uninterrupted. To move the housing 44 to the transport or the shipping position, the section 48 is rocked upwardly and the bale handling system 40 moved to the upright position. The cylinder structure is retracted to rock the section downwardly towards the closed position. However, hook structure 62 on the upright handling system 40 is in the path of travel of a mating member 63 the section 48 and latches to the section 48. Thereafter, the cylinder structure is put into a float condition. The latching structure 58 is operated to release the front frame section 46, and the handling system 40 is then moved downwardly. The sections 46 and 48 move downwardly primarily under the influence of gravity with the system 40. Since the section 48 is positively latched to the handing system 40 at 62 and 63, the system 40 can exert a pull on the sections if necessary.

The air duct system 22 is supported by a duct lift system indicated generally at 70 which can be retracted to telescope the ducts and move the uppermost duct outlets 24 to a position generally level with the top of the cab 18. The lift system can be of the type shown and described in copending and commonly assigned patent application Ser. No. 09/987,242 entitled DUCT SUPPORT AND TRANSITION STRUCTURE FOR A HARVESTER filed 13 Nov. 2001. The ducts 23, accumulator 30 and housing 44 can all be lowered to a level generally aligned with the top of the cab for transport or shipping. The volume of the accumulator structure 30 is less than that of a conventional basket.

The hood structure 31 extends completely over the open top of the section 30a and an air delivery system propels air, cotton and debris in a path generally horizontally towards the rear wall of the section 30a. Each duct outlet 24 opens upwardly and rearwardly into the hood structure 31 which separates dirt and debris from the propelled material and deflects the cotton into the accumulator sections 30*a* and 30*b*.

The metering floor 32 includes a support frame 90 carried by the harvester frame 12 and connected to the lower end of the lower accumulator section 30*b*. The frame 90 rotatably mounts an upper roller 92, intermediate rollers 94 and 96 and lower roller 98 generally in a plane which angles downwardly with respect to a conveyor 100 in a downstream direction towards the processing structure 34.

Figure 3:
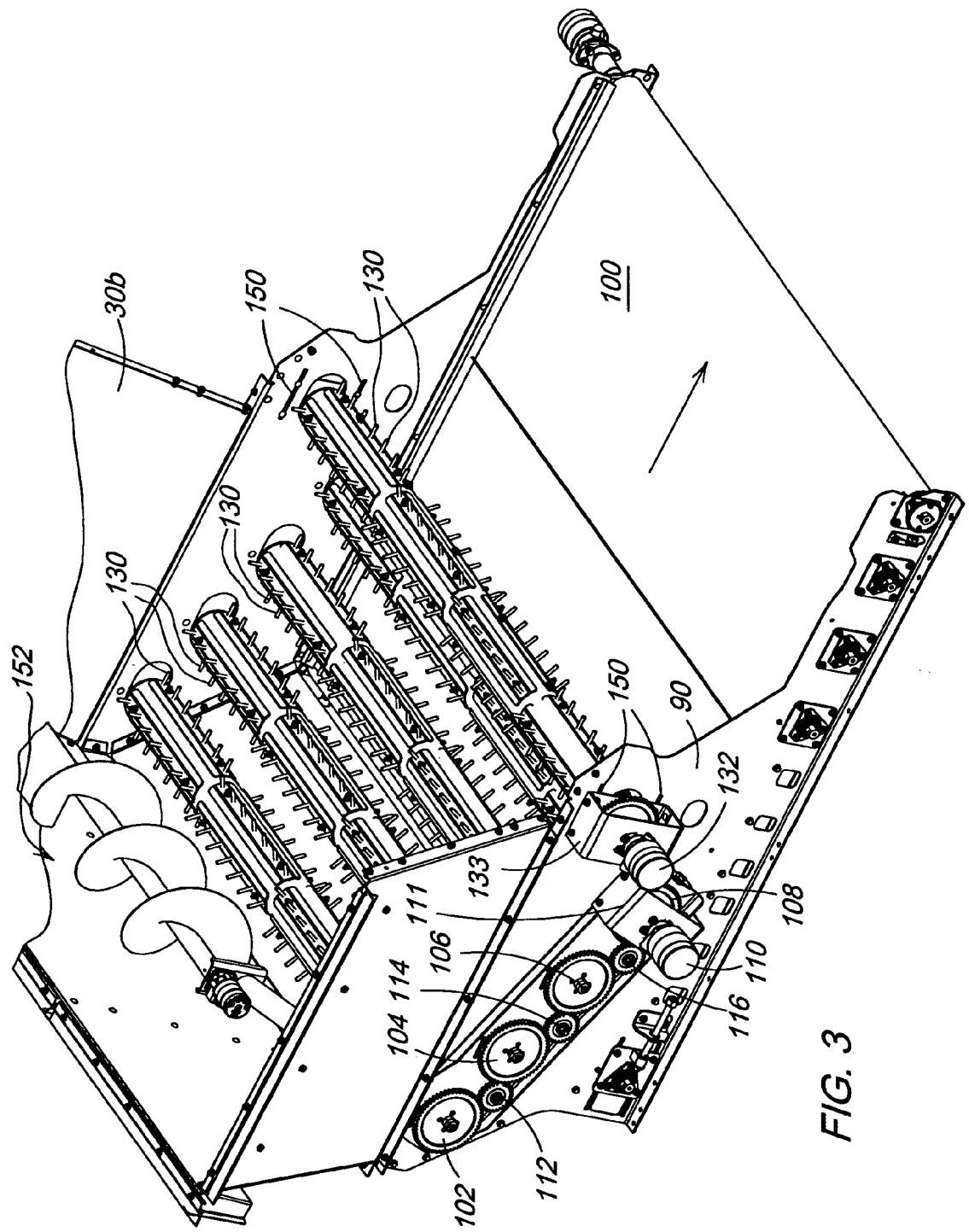
FIG. 3 is an enlarged perspective view of the roller structure of FIG. 1.

Drive sprockets 102, 104, 106 and 108 (FIG. 3) are fixed to an end of each roller and are rotated about respective roller axes by a variable speed hydraulic motor 110 and idler sprockets 112, 114 and 116 meshing with adjacent drive sprocket pairs to provide rotation of the rollers in the same direction (clockwise as shown in the Figures). As shown, the motor 110 is supported by a bracket 111 on the frame 90 in alignment with the axis of the lower roller 98.

An upper discharge roller 120 is supported above and slightly rearwardly of the lower roller 98 to define a main discharge opening 124 which opens downwardly and rearwardly towards the conveyor 100. The rollers 92–98 and the discharge roller 120 are spaced so that when non-driven they act to close and prevent egress of the cotton from the accumulator to the conveyor 100. For example, when the processor 34 is stopped to unload a bale or module 36, the harvesting operation can continue as the drive to the rollers 92–98 and 120 is interrupted, and cotton harvested during the unloading procedure is stored in the accumulator. The accumulator system also prevents short-term variations in the amount of cotton harvested, such as the variations caused by spotty field conditions and skips or ends in the row, from adversely affecting the supply of material to the processor 34 when the processor is operating.

Spiked projections 130 are uniformly spaced laterally on each of the rollers 92–98. The spiked projections 130 having lengths about equal to the radius of supporting portion of the rollers and pull cotton down the incline (arrow 134 of FIG. 2) toward the main accumulator discharge opening 124. The roller action generally maintains the exiting cotton above the axis of the rollers as the cotton is moved downstream towards the discharge opening 124.

Figure 2:
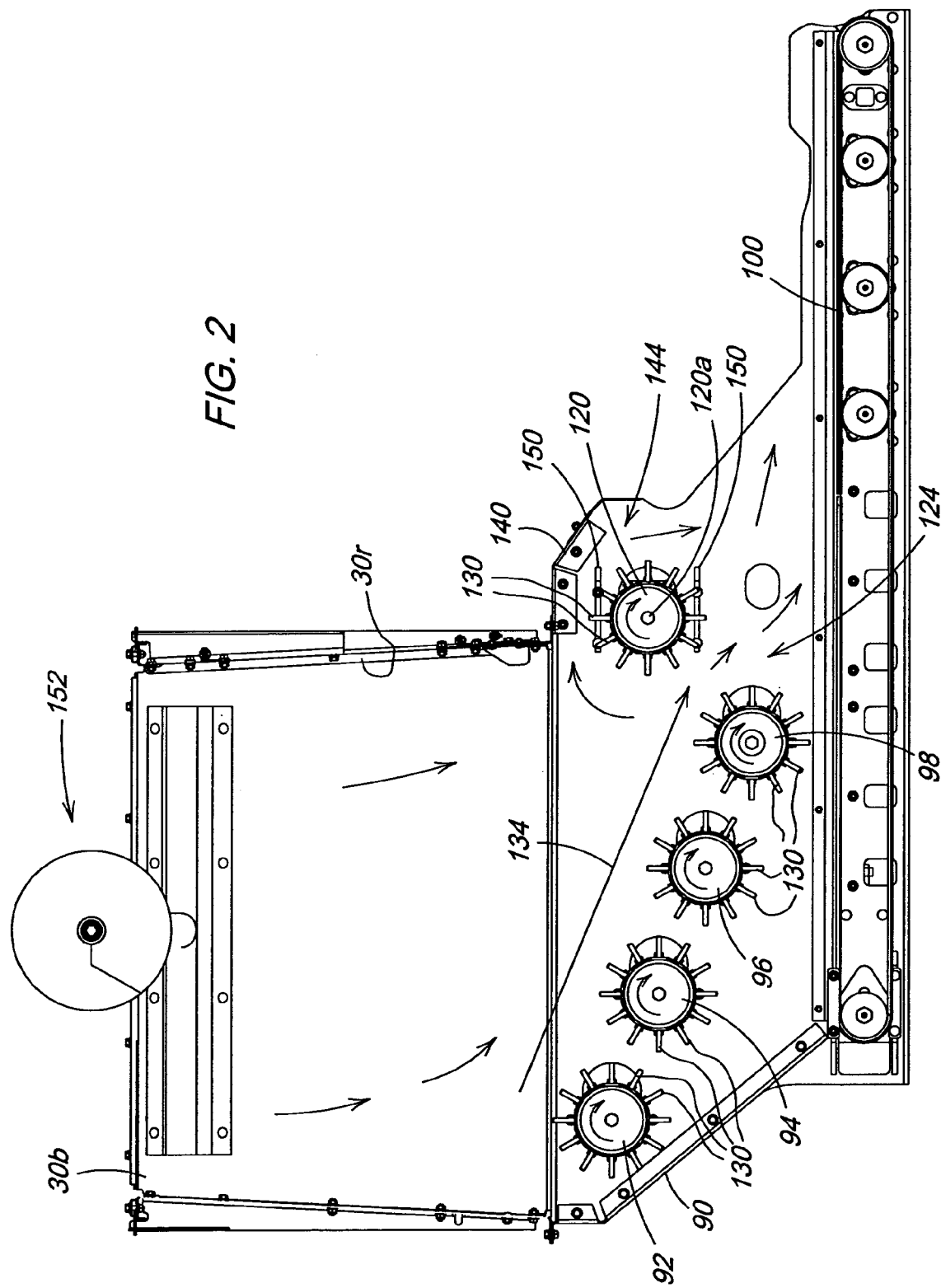
FIG. 2 is an enlarged side view of the cotton feeding roller structure with parts removed to better show the roller configuration.

The upper discharge roller 120 also includes spiked projections 130 and is driven by a variable speed hydraulic motor 132 supported from the frame 90 by a bracket 133. The discharge roller 120 is driven in the same direction (clockwise) as the rollers 92–98 but at a higher speed than the rollers 92–98. As best seen in FIG. 2, the discharge roller 120 is supported for rotation by the frame 90 directly below the rear wall 30*r* and at least partially outside the plane of the wall 30*r* so that the roller 120 is only partially exposed to the cotton above the roller in the accumulator. The roller 120 has a rotational axis 120*a* offset behind the wall 30*r* and below upper panel structure 140 to define an upper discharge opening indicated generally at 144 in FIG. 2 between the upper portion of the roller 120 and the panel structure. By partially housing the roller 120 outside the plane of an accumulator wall, the roller 120 acts primarily to break up clumps and meter cotton moved by the rollers 92–98, rather than pulling cotton downwardly directly from the accumulator section 30*b*.

The lower spiked rollers 92–98 all rotate at the same speed and direction to pull the cotton to the lower discharge opening 124 and force the cotton against the upper spiked roller 120. The lowermost roller 98 pulls the cotton through the discharge opening 124 while the higher speed roller 120 tears apart clumps and limits the amount of cotton that can pass through the opening 124. The cotton that is forced against the roller 120 is pulled through the upper discharge opening 124, and the spiked projections 130 tear apart any clumps. The cotton flow rate through the lower discharge opening 124 is controlled by the speed of the motor 110. The cotton flow rate through the upper discharge opening 144 is controlled by the speed of the motor 132 and by the clearance around the upper discharge roller 120. The upper discharge roller 120 is supported by slotted portions 150 in the frame 90 and is adjustable in the fore-and-aft direction to vary the roller axis relative to the plane of the wall 30 so that the aggressiveness of the roller 120 can be changed. An auger assembly 152 is supported for rotation near the top of the accumulator section 30*b* to prevent bridging and improve cotton flow and distribution in the accumulator.

Having described the preferred embodiment, it will become apparent that various modifications can be made without departing from the scope of the invention as defined in the accompanying claims. For example, the accumulator floor may be defined by a continuous belt or chain conveyor trained around conventional drive rollers or pulleys generally located where the upper and lower spaced rollers 92 and 98 are shown.

We claim:

1. In a mobile cotton harvester having selectively operable processing structure connected to the harvester for processing harvested cotton in a field, accumulator structure comprising:

an upright storage area having side walls and having a lower discharge area, the upright storage area receiving the harvested cotton and facilitating continuous harvester operation;

a cotton metering structure including upper and lower rotatable spaced rollers, the metering structure defining an inclined accumulator floor angling downwardly towards the lower discharge area;

a drive connected to the metering structure for rotating the spaced rollers in a same direction to urge the received cotton from the storage area towards the lower discharge area; and and a discharge roller located above the lower roller and discharge area, the discharge roller intercepting the cotton urged towards the lower discharge area to break up cotton clumps and meter cotton to the discharge area.

2. The accumulator structure set forth in claim 1 wherein the discharge roller is rotated in the same direction as the spaced rollers.

3. The accumulator structure as set forth in claim 2 including a discharge space located over the discharge roller, the discharge roller pulling cotton through the discharge space towards the discharge area.

4. The accumulator structure as set forth in claim 3 wherein the lower spaced roller pulls cotton under the discharge roller towards the discharge area.

5. The accumulator structure as set forth in claim 1 wherein the lower spaced roller pulls cotton under the discharge roller.

6. The accumulator structure as set forth in claim 5 including a cotton egress path located over the discharge roller and wherein the discharge roller pulls cotton through the cotton egress path as the discharge roller breaks the clumps of cotton.

7. The accumulator structure as set forth in claim 6 wherein the drive rotates the upper and lower spaced rollers and the discharge rollers in the same direction.

8. The accumulator structure as set forth in claim 7 wherein upper and lower spaced rollers rotate to pull cotton over spaced rollers.

9. The accumulator structure as set forth in claim 1 wherein the discharge roller is rotated at a speed higher than the speed of the upper and lower spaced rollers.

10. The accumulator structure as set forth in claim 1 wherein the discharge roller is located at least partially outside one of the walls of the upright storage area so that the discharge roller is only partially exposed to the cotton in the storage area above the discharge roller.

11. The accumulator structure as set forth in claim 10 wherein the side walls include an offset area housing the discharge roller and defining a discharge path over the discharge roller.

12. In a mobile cotton harvester having selectively operable processing structure connected to the harvester for processing harvested cotton in a field, accumulator structure comprising:

an upright storage area having side walls and having a downstream discharge area, the upright storage area receiving the harvested cotton and facilitating continuous harvester operation;

a cotton metering structure including a rotatable member at least partially defining an accumulator floor angling downwardly in a discharge direction towards the downstream discharge area, wherein the rotatable member has an axis of rotation generally perpendicular to the discharge direction;

a drive connected to the metering structure for rotating the rotatable member about the axis and directing cotton over the floor towards the downstream discharge area; and a discharge member located above the accumulator floor and discharge area, the discharge member intercepting the cotton directed towards the downstream discharge area to break up cotton clumps and meter cotton to the discharge area.

13. In a mobile cotton harvester having selectively operable processing structure connected to the harvester for processing harvested cotton in a field, accumulator structure comprising:

an upright storage area having side walls and having a downstream discharge area, the upright storage area receiving the harvested cotton and facilitating continuous harvester operation;

a cotton metering structure including means for defining an accumulator floor angling downwardly towards the downstream discharge area;

drive means connected to the metering structure for directing cotton over the floor towards the downstream discharge area;

a discharge member located above the accumulator floor and discharge area, the discharge member intercepting the cotton directed towards the downstream discharge area to break up cotton clumps and meter cotton to the discharge area; and wherein the means for defining an accumulator floor includes spaced rollers and the drive means rotates the spaced rollers in the same direction.

14. The accumulator structure as set forth in claim 13 wherein the discharge member includes a discharge roller located above the spaced rollers.

15. The accumulator structure as set forth in claim 14 wherein the discharge roller defines an upper discharge area above the lower discharge area, and wherein the discharge roller moves cotton through the upper discharge area.

16. The accumulator structure as set forth in claim 15 including a discharge roller drive rotating the discharge roller in the same direction as the spaced rollers.

17. The accumulator structure as set forth in claim 16 wherein the discharge roller drive rotates the discharge roller at a faster speed than spaced roller speed.

18. The accumulator structure as set forth in claim 14 wherein the spaced roller and the discharge rollers comprise rollers with projecting spiked members.

19. The accumulator structure as set forth in claim 18 wherein the discharge roller is rotated at a higher speed than the spaced rollers.

20. In a mobile cotton harvester having selectively operable processing structure connected to the harvester for processing harvested cotton in a field, accumulator structure comprising:

an upright storage area having side walls and having a downstream discharge area, the upright storage area receiving the harvested cotton and facilitating continuous harvester operation;

a cotton metering structure including means for defining an accumulator floor angling downwardly towards the downstream discharge area;

drive means connected to the metering structure for directing cotton over the floor towards the downstream discharge area;

a discharge member located above the accumulator floor and discharge area, the discharge member intercepting the cotton directed towards the downstream discharge area to break up cotton clumps and meter cotton to the discharge area; and wherein the means for defining an accumulator floor includes spaced rollers and a continuous conveyor trained around the spaced rollers.

* * * * *